United States Patent

Wilson

[11] Patent Number: 5,449,899
[45] Date of Patent: Sep. 12, 1995

[54] APPARATUS AND METHOD FOR HIGHLIGHTING RETURNS FROM OPTICALLY AUGMENTED TARGETS

[75] Inventor: Ronald O. Wilson, Nashua, N.H.

[73] Assignee: Lockheed Sanders, Inc., Nashua, N.H.

[21] Appl. No.: 191,278

[22] Filed: Oct. 21, 1971

[51] Int. Cl.6 .................. H01J 40/14; G08B 13/18
[52] U.S. Cl. .................. 250/214 B; 250/222.1; 340/555
[58] Field of Search .......... 340/258 B, 258 D, 228 S, 340/555; 250/221, 222, 222.1, 214 B, 561

[56] References Cited

U.S. PATENT DOCUMENTS

| | | | |
|---|---|---|---|
| 3,207,904 | 9/1965 | Heinz | 250/222 R |
| 3,329,946 | 7/1967 | Robbins | 340/258 B |
| 3,436,540 | 4/1969 | Lamorlette | 250/222 R |
| 3,444,544 | 5/1969 | Pearson et al. | 340/258 B |
| 3,644,917 | 2/1972 | Perlman | 340/258 B |

Primary Examiner—Stephen C. Buczinski
Attorney, Agent, or Firm—David W. Gomes

[57] ABSTRACT

A method and apparatus for highlighting returns from optically augmented targets includes in one embodiment a receiver, a viewing device coupled to the receiver and first and second illuminators. The first illuminator is arranged on axis with the receiver and the second illuminator is placed off-axis therefrom. Means are provided for switching on alternately the illuminators such that returns of the first illuminator through retroreflection from high quality optical targets will enter the receiver, while retroreflection returns of the off-axis illuminator will not enter the receiver; therefore the retroreflected returns from high quality optical targets will appear to flicker when seen on the viewing device and thus be highlighted above the rest of the scene.

15 Claims, 2 Drawing Sheets

APPARATUS AND METHOD FOR HIGHLIGHTING RETURNS FROM OPTICALLY AUGMENTED TARGETS

BACKGROUND OF THE INVENTION

With the ever increasing crime rate, increased attention has been placed on means for preventing the commission thereof. Crimes such as burglary are usually committed during the nighttime under the cover of darkness. Police and other security personnel have a need for instrumentalities to detect the criminal, particularly when the criminal is some distance away, as might be snipers hidden on roof tops or intruders within large buildings or areas to be secured.

In recent years security personnel have had the aid of devices employing image intensifier tubes to assist them in detecting intruders. However, often the persons to be detected are hidden behind objects, in bushes or elsewhere, so as to make detection difficult if not impossible.

It has been proposed to use optical retroreflection principles to detect the presence of these intruders. However, devices using these principles to detect the intruders human eye or his vision aids such as binoculars or periscopes, will also detect reflected light from broken glass, tin cans and dew drops, as well as reflected light from those of a cat or other nocturnal animal, thereby making the false alarm rate intolerable.

SUMMARY OF THE INVENTION

Accordingly, it is an object of this invention to provide an improved optical surveillance system.

It is another object of this invention to provide an optical surveillance system in which high quality optics are readily distinguished from reflective surfaces in order to reduce false alarm rates.

It is a further object of this invention to provide an optical surveillance system in which returns from high quality optics appear to blink.

Briefly, an optical surveillance system is provided which will allow an optically augmented target, which has a small reflectance angle, to be highlighted when viewed through a light amplification imaging device. The apparatus comprises a first illuminating source placed on axis with the viewing device, such that retroreflection from high quality optical targets will return to the source and overfill it sufficiently so that some of the return will come back into the receiver of the viewing device, and a second illuminator which is placed off-axis from the first illuminator so that retroreflection of this off-axis illuminator will not enter the receiver.

The two illuminators are alternately switched on so that there is no darkness in the receiver's screen, and the high quality optical targets will appear as a rapid flickering of the target against a steady background return since a retroreflection will return to the receiver only from the on- axis illuminator.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
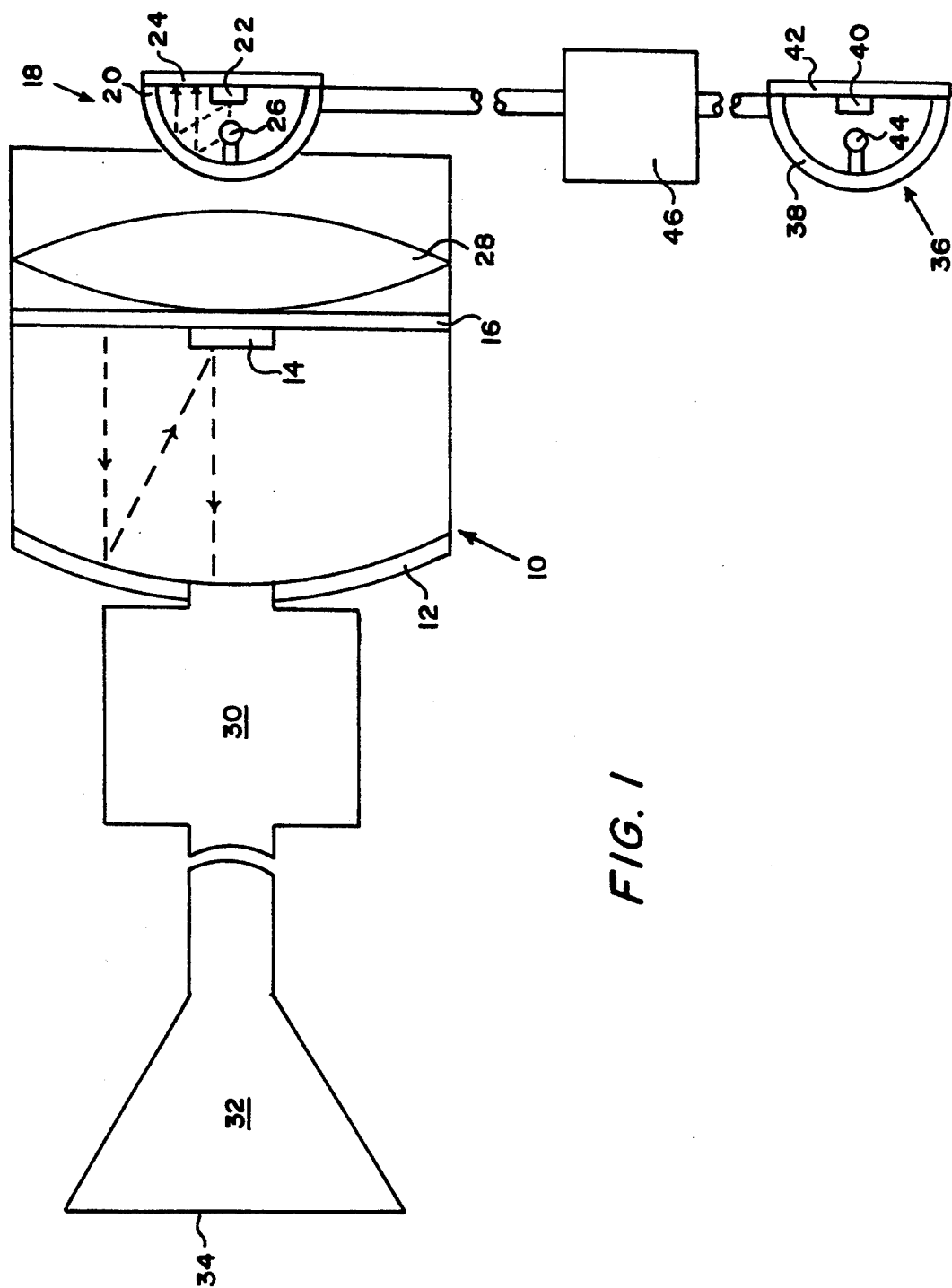
FIG. 1 is a sketch of a first embodiment of an optical surveillance system.

FIG. 1 is a sketch of an optical surveillance system structured according to the invention, and comprises a catadioptic receiver assembly 10, including a spherical mirror 12, a plain mirror 14 arranged on a transparent window 16 and a lens 28. A catadioptic type transmitter assembly 18 (first illuminator) comprises a spherical mirror 20 and a plain mirror 22 arranged on the inside surface of a transparent window 24. (Note that this is not a true catadioptic assembly since no refractive optics are included. ) A light source 26 is arranged between the mirrors 20 and 22.

An image intensifier tube 30 is arranged at the center of spherical mirror 12 to receive reflected light incoming to the assembly 10. Coupled to image intensifier tube 30 is an expander tube 32, having phosphorescent viewing screen 34.

Separated from the first transmitter assembly is a second or outrigger catadioptic type or reflected beam transmitter assembly 36 (second illuminator) comprising spherical mirror 38, plain mirror 40, transparent window 42 and light source 44.

Intermediate the two transmitter assemblies 18 and 36 is a switching unit 46. The electronic schematic for switching unit 46 is set forth in detail in FIG. 2. Switching electronics is used to alternately turn on the illuminators 18 and 36.

The operation of the optical enhancer of FIG. 1 involves the alternately pulsing of the two illuminators 18 and 36. When one illuminator is switched on, the other is switched off. Preferably these illuminators are identical in intensity and spectral and spacial coverage.

A retroreflection will return from a high quality target along the line of sight back to the illuminating source. The technique utilizes the retroreflection characteristics of retro targets (such as the one used on the moon landing) which return a very narrow beam of light towards the illuminating source. Thus, the return from a high quality optical target will come back into illuminator 18 and enough will spill over into the receiver 10 so as to be detectable as a small point of reflecting light. Retroreflected returns from high quality optics of a beam emanating from illuminator 36 (which is beamed on the same field of view as illuminator 18) will not be picked up by the receiver 10 and thus no detection. Therefore, the retroreflective returns from a high quality optical target will appear in the viewing device 34 as rapidly pulsing beads of light.

The purpose of the second illuminator 36 is to insure that the background will be bright and steady.

Retroreflection devices which have a wide divergence angle such as automobile reflectors will be seen as steady lights since returns from such targets from beams of both the illuminators 18 and 36 will be picked up by the receiver 10. Cats eyes, as well as other nocturnal animals, and fowl, which have very wide angles of return, will also be seen as steady lights, and thereby readily distinguishable from high quality optical targets.

Although catadioptic type optics assemblies have been shown for the illuminator and receiver assemblies 10, 18 and 36, a simple reflector could be used in place thereof. The total reflected beam assembly is preferably used in order to shape the beam such that no light will emanate out of the side (out of the beam) of the assembly which would be reflected by fog and enter the receiver, as feedback.

In the preferred embodiment the light sources 26 and 44 are simple tungsten bulbs, however, other incandescent bulbs, zenon lamps, lasers or light emitting diodes could be substituted therefore, especially if high repetition rates were desired.

The lateral separation of the illuminators is made large enough so that retroreflection from the off-axis illuminator will not enter the receiver optics; preferably the lateral separation is three inches per one hundred feet of range for each milliradian of reflectance angle. In the preferred embodiment the illuminators are separated by twelve inches.

It should be noted that in order to detect a high quality optical target the target must have the receiver within its peripheral vision or field of view. The illuminators may alternate on and off at repetition rates of from one per second to several thousand per second and, preferably, five times per second is used. In the reduction to practice of the present invention the illuminators are not on and off equal periods of time, but rather the illuminator 18 was on twenty percent of the time, and the illuminator 36 eighty percent of the time. Keeping illuminator 26 on the shorter time is employed to minimize feedback into the receiver during periods of fog or rain.

It is desired that the beam pattern of the two illuminators be the same or nearly so. The optimum results will occur in scene imaging when both illuminators are uniform across the field of view and are equivalent in coverage to the receiver field of view.

The invention makes use of a flickering (or modulated) target against a steady scene in gated as well as a non-gated receiver systems, a covert as well as a visible illumination system, and a manned as well as an unmanned (television) viewing system. The technique can be used to cover spectrums including the complete ultraviolet, visible and infrared and used to provide recognition of such targets as high quality corner cubes, binoculars, telescopes, certain animals and human beings; for the purpose at hand a high quality optical target is defined as having a return angle of one milliradian or less.

Figure 2:
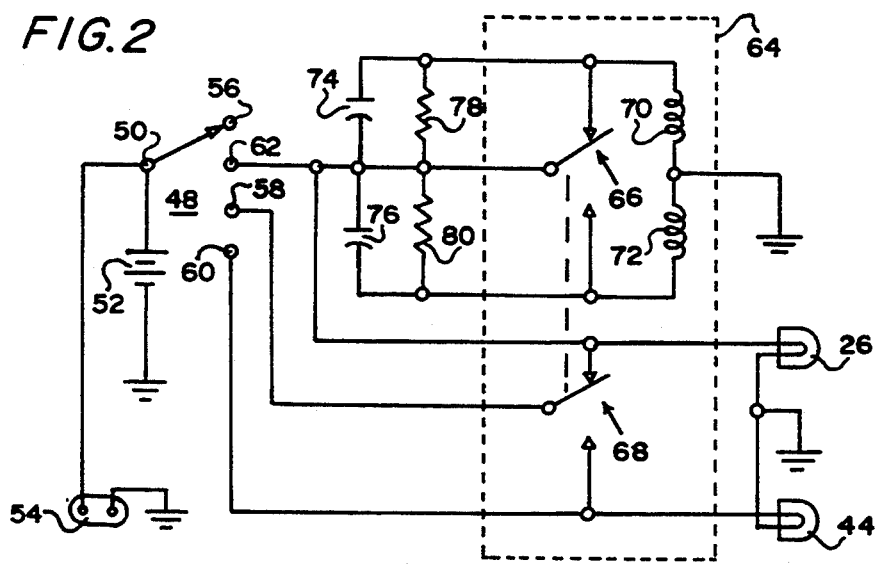
FIG. 2 is an electrical schematic employed in the embodiment of FIG. 1.

The trigger electronics unit 46 is illustrated schematically in FIG. 2, and comprises a four position switch 48 having a center arm 50, connected to a battery 52. A connector 54 may also be coupled to center arm 50 for coupling to a battery charger (not shown) to charge the battery 52.

To turn the unit off, center arm 50 is connected to contact 56 of switch 48. To turn on only illuminator 26, center arm switch 50 is connected to contact 58; to turn on only illuminator 44, center arm 50 is connected to contact 60; and to alternately turn on and off both illuminators, Z center arm 50 is connected to contact 62. Illuminator 44 would be used in fog or rain conditions.

The switch 48 is connected to the illuminators through a relay 64, having contacts 66 and 68, and coils 70 and 72. In the preferred embodiment the relay employs make before break contacts, thereby giving some overlap so that when the illuminators are in the mode where they are alternately switched, one illuminator is always on and stays on until the other illuminator comes completely on. Capicators 74 and 76, and resistors 78 and 80 provide RC time constants to determine the switching rate and duty cycle of the illuminators.

Figure 3A:
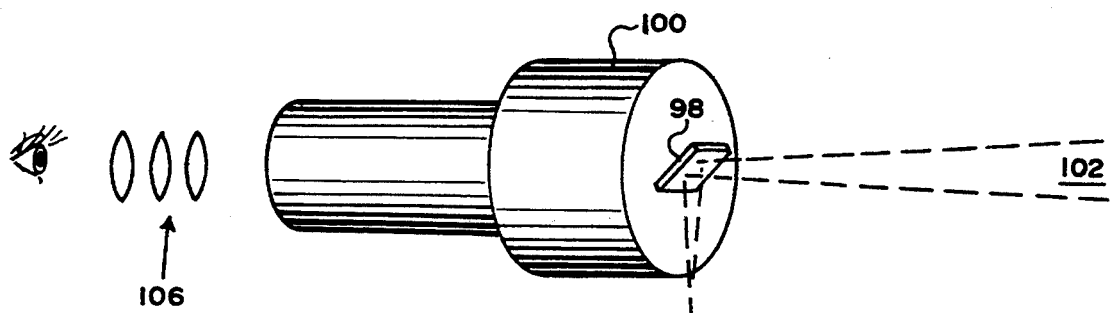
FIG. 3A is a sketch of an alternate embodiment of an optical surveillance system.

An alternate embodiment of an optical surveillance system is illustrated in FIG. 3A and requires only a single illuminator 82. The output from illuminator 82, which preferably is configured in the same manner as in the system of FIG. 1, is applied through a rotating segmented mirror wheel 84 to a pair of mirrors 86 and 88.

Figure 3B:
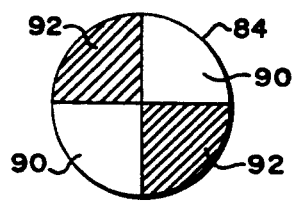
FIG. 3B is a sketch of a segmented mirror wheel employed in the system of FIG. 3A.

Segmented mirror wheel 84 is illustrated in greater detail in FIG. 3B and comprises alternate sections of clear glass 90 and mirrored sections 92. Although the embodiment of FIG. 3B shows the segmented mirror wheel as comprising quarter sections, this is illustrative only, and it is obvious that the wheel can be divided up into other fractional sections of alternating mirror and clear portions. Also, if it is desired that the beam from illuminator 82 impinge upon mirrors 86 and 88 nonuniformly, the clear glass and mirror sections do not have to be of the same size.

The segmented mirror wheel 84 is rotated by a motor 94 through a set of gears 96. When the illuminator 82 is aligned with a clear section of the segmented mirror wheel, light will pass through the wheel and impinge upon mirror 86 and be reflected to and from a mirror 98, which is arranged on axis of an image intensifier tube 100, thus producing the incident on-axis illumination 102. When the output of illuminator 82 is aligned with the mirrored sections of the segmented wheel 84, the illumination emanating from 82 will be reflected to and from a mirror 88, thus producing the off-axis illumination 104. The user will view the output of the image tube through a lens system 106.

As in the system of FIG. 1, an expander tube having a phosphorescent viewing screen may be coupled to the image intensifier tube.

In this embodiment, no switching electronics is required and, as before, retroreflected returns of the incident illuminating wave 102 from high quality optical targets will return to the mirror source 98 and overfill it sufficiently so that some of the return will come back into the receiver 100. Retroreflected returns of the beam 104 from high quality optical targets will return to the mirror 88 and not be picked up by the receiver 100, thereby producing the desired blinking effect.

This alternate embodiment permits the use of large light sources, such as tungsten halogen and iodine lights, which cannot be switched rapidly. Furthermore, since the light source is used as a steady illuminator, it will have a longer life than a pulsed source.

While I have described above the principles of my invention in accordance with specific apparatus, it is to be clearly understood that the description is made only by way of example and not as a limitation of the scope of my invention as set forth in the accompanying claims.

I claim:

1. Apparatus for highlighting returns from optically augmented targets, comprising:
   means for generating first and second beams of illuminating energy;
   a receiver;
   said first illuminating energy beam generating means being arranged with respect to said receiver so that some of the energy radiated by said first illuminating energy generating means retroreflected by high quality optical targets will be incident on said receiver;

said second illuminating energy beam generating means being arranged with respect to said receiver so that the energy radiating by said second illuminating energy generating means retroreflected by high quality optical targets will not be incident on said receiver; and means for alternately turning on and off said first and second illuminating energy beam generating means, whereby high quality optical targets will appear in said receiver as pulses.

2. Apparatus for highlighting returns from optically augmented targets in accordance with claim 1, wherein said receiver includes a viewing device and means for focusing received illuminating energy into said viewing device.

3. Apparatus for highlighting returns from optically augmented targets in accordance with claim 2, said viewing device being an image intensifier tube.

4. Apparatus for highlighting returns from optically augmented targets in accordance with claim 3, further including an expander tube having a phosphorescent viewing screen coupled to said image intensifier tube.

5. Apparatus for highlighting returns from optically augmented targets in accordance with claim 1, wherein said receiver includes a catadioptic assembly.

6. Apparatus for highlighting returns from optically augmented targets in accordance with claim 1, wherein said first and second illuminating energy beams generating means provide substantially identical intensity and spectral and spacial coverage.

7. Apparatus for highlighting returns from optically augmented targets in accordance with claim 1, wherein said first and second illuminating energy beam generating means are alternately turned on and off at repetition rates of from once per second to ten thousand times per second.

8. Apparatus for highlighting returns from optically augmented targets in accordance with claim 1, wherein said second illuminating energy beam generating means is on a greater percentage of the time than said first illuminating energy beam generating means.

9. Apparatus for highlighting returns from optically augmented targets in accordance with claim 8, wherein said second illuminating energy beam generating means is on eighty percent of the time and said first illuminating energy beam generating means is on twenty percent of the time.

10. Apparatus for highlighting returns from optically augmented targets in accordance with claim 1, wherein said means for alternately turning on and off said illuminating energy beam generating means includes means for ensuring that one illuminating energy beam generating means remains on until after the other illuminating energy beam generating means is turned off.

11. Apparatus for highlighting returns from optically augmented targets in accordance with claim 1, wherein said first and second illuminating energy beam generating means includes first and second mirrors, said first mirror being arranged substantially coaxial with respect to said receiver with said second mirror arranged off axis from said receiver.

12. Apparatus for highlighting returns from optically augmented targets in accordance with claim 11, further including a source of illuminating energy and means for alternately directing the output of said source to said first and second mirrors.

13. Apparatus for highlighting returns from optically augmented targets in accordance with claim 12, further including a rotating segmented wheel having alternate transparent and mirrored sections, the output of said illuminating source being incident on said segmented mirror wheel to apply its output alternately to said first and second mirrors.

14. Apparatus for highlighting returns from optically augmented targets in accordance with claim 13, further including means for rotating said segmented wheel.

15. A method for highlighting returns from optically augmented targets comprising the steps of;
generating a first beam of illuminating energy along a first line of sight;
generating a second beam of illuminating energy along a second line of sight;
receiving along said first line of sight retroreflected returns from high quality optical targets;
and alternately turning on and off said sources of illuminating energy, whereby high quality optical targets will be highlighted above the background scene as a rapid flickering.

* * * * *